United States Patent [19]

Sato et al.

[11] Patent Number: 5,280,304

[45] Date of Patent: Jan. 18, 1994

[54] THERMAL PRINT HEAD IN WHICH A SERIES OF SEMICONDUCTOR CHIPS ARE ELECTRICALLY CONNECTED TO EACH OTHER

[75] Inventors: Hajime Sato; Takuji Nakazono, both of Yokohama; Hiroki Nakamura, Chigasaki, all of Japan

[73] Assignee: Kabushiki Kaisha Toshiba, Kawasaki, Japan

[21] Appl. No.: 934,271

[22] Filed: Aug. 25, 1992

Related U.S. Application Data

[62] Division of Ser. No. 666,047, Mar. 7, 1991.

[30] Foreign Application Priority Data

Mar. 8, 1990 [JP] Japan .................................. 2-54867
Nov. 26, 1990 [JP] Japan ................................. 2-317699

[51] Int. Cl.[5] .......................... G01D 15/10; H04N 1/23
[52] U.S. Cl. ........................... 346/76 PH; 358/213.11;
358/296; 358/471; 358/483
[58] Field of Search ............... 358/296, 471, 472, 474,
358/482, 483, 213.11, 213.13, 213.22; 346/76;
357/30; 250/578.1

[56] References Cited

U.S. PATENT DOCUMENTS 4,987,477 1/1991 Ikeno ..................................... 357/75
5,028,935 7/1991 Warmack et al. .............. 346/76 PH

FOREIGN PATENT DOCUMENTS 0246481 11/1987 European Pat. Off. .
0296725 12/1988 European Pat. Off. .
59-6664 1/1984 Japan .
62-31159 2/1987 Japan .
62-31160 2/1987 Japan .

Primary Examiner—George H. Miller, Jr.
Assistant Examiner—Eric Frahm
Attorney, Agent, or Firm—Cushman, Darby & Cushman

[57] ABSTRACT

In an image reading apparatus, first and second semiconductor chips are arranged in series on a transparent insulative base. The semiconductor chips are covered by a protective layer and have conductive pads located both side of the series arrangement of the chips. A traveling path in which a document passes is defined on the protective layer between the pads.

50 Claims, 8 Drawing Sheets

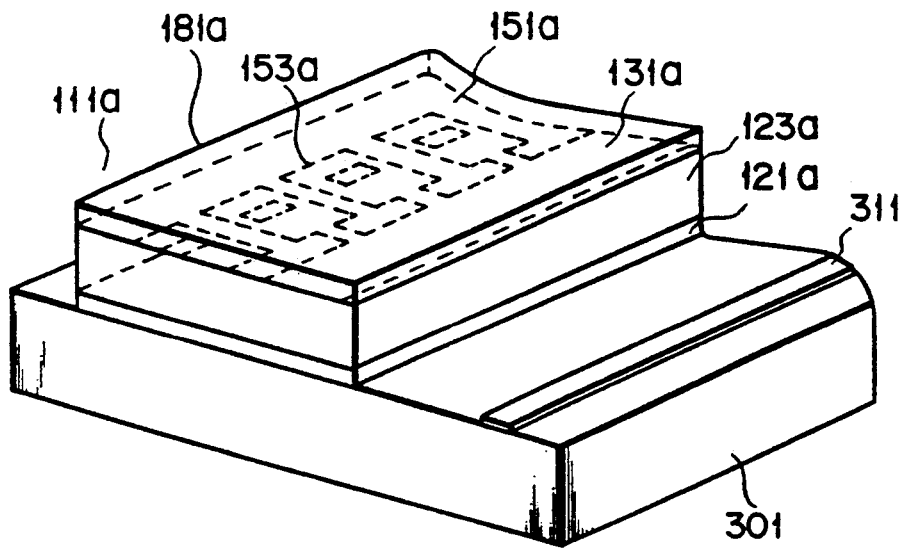
F I G. 2
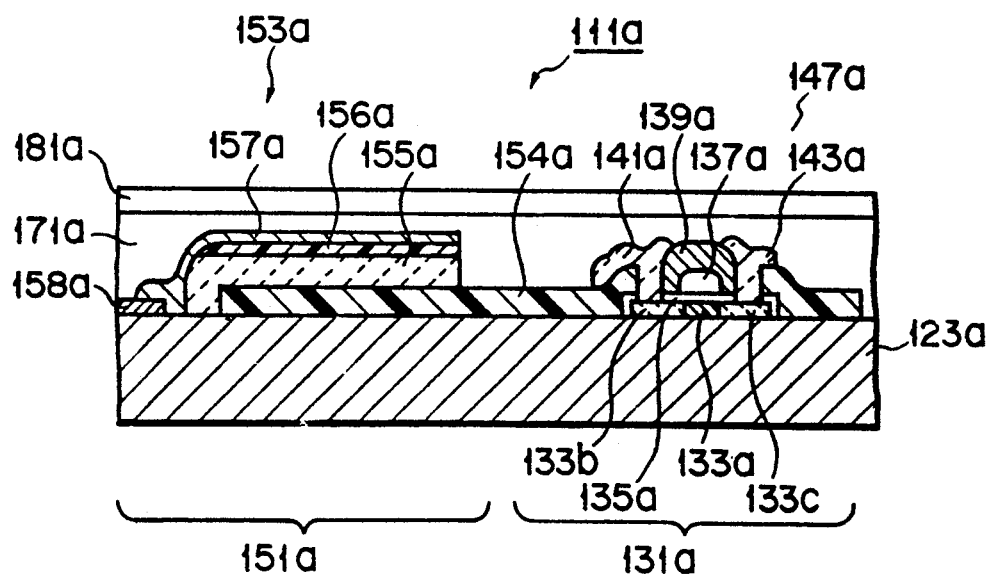
F I G. 3

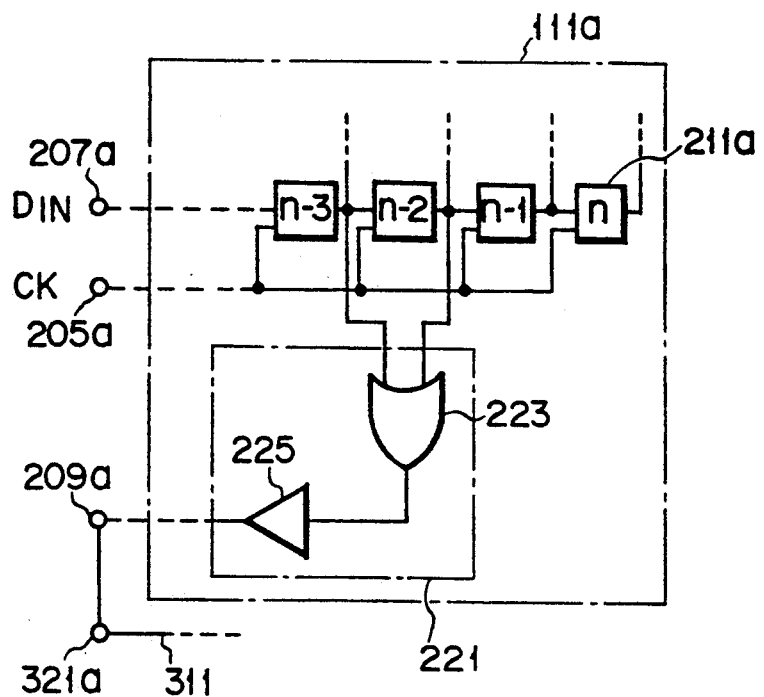
F I G. 5A
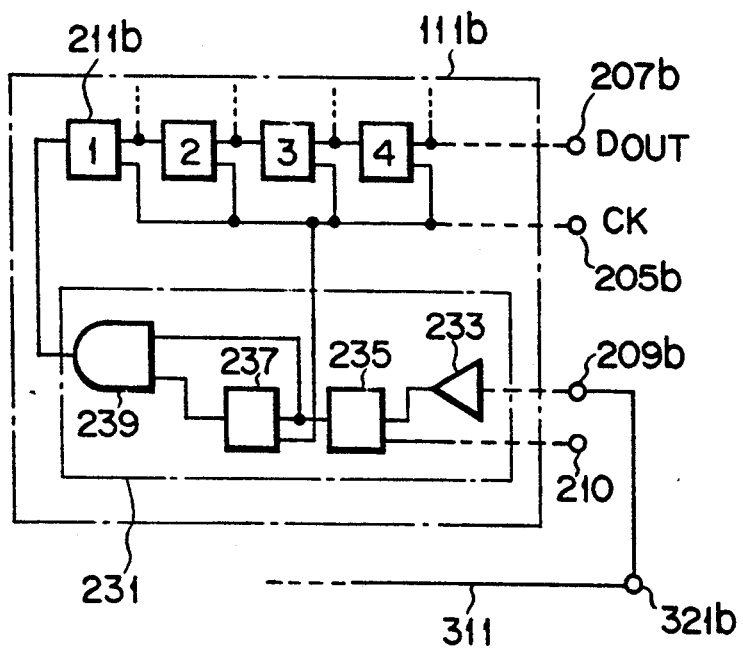
F I G. 5B

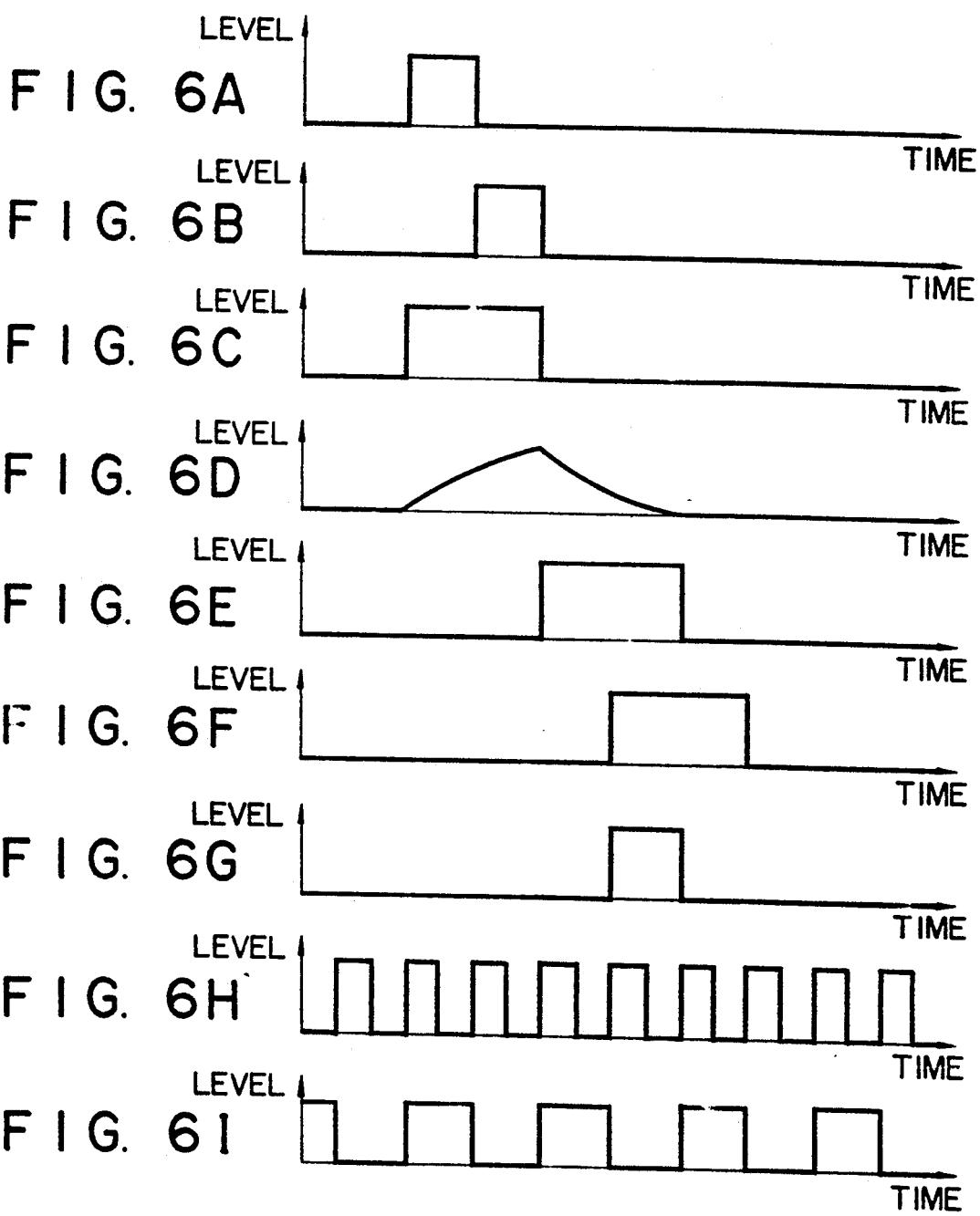

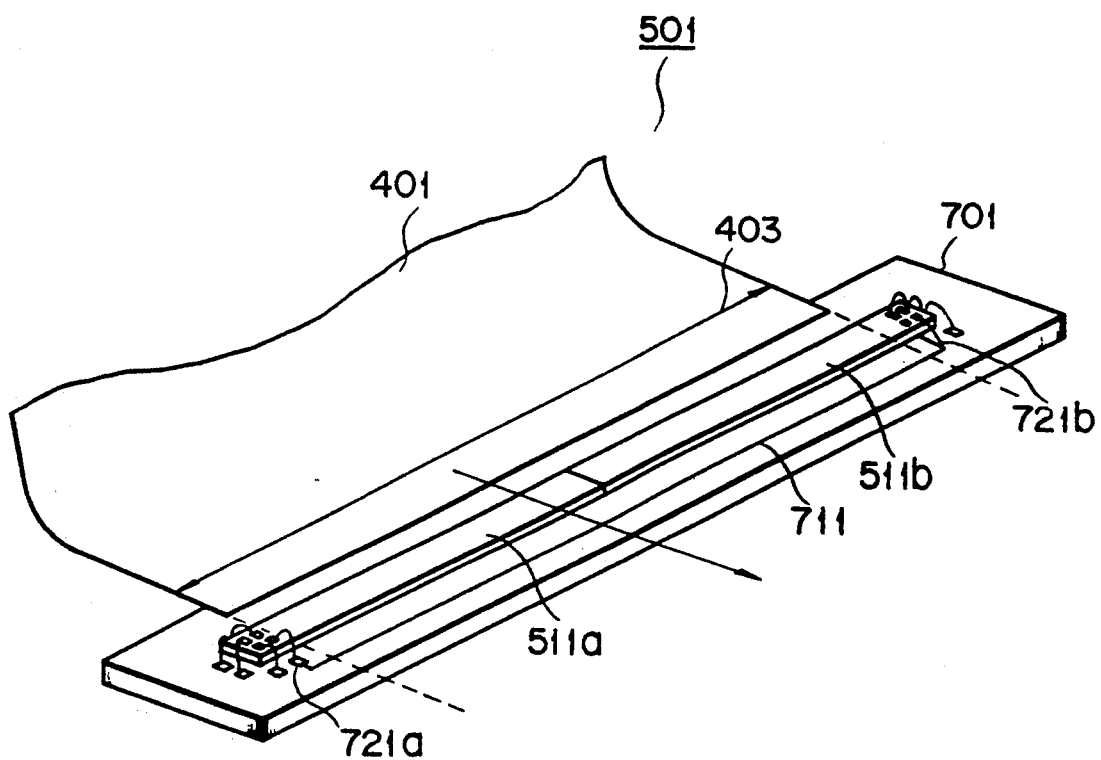
F I G. 7

THERMAL PRINT HEAD IN WHICH A SERIES OF SEMICONDUCTOR CHIPS ARE ELECTRICALLY CONNECTED TO EACH OTHER

This is a division of application Ser. No. 07/666,047, filed Mar. 7, 1991.

BACKGROUND OF THE INVENTION

1. Field of the Invention

The present invention relates to a semiconductor device in which a series of semiconductor chips are electrically connected to each other, and, more particularly, are incorporated to apparatuses such as an image reader wherein semiconductor chips are incorporated to convert information on a document into an electrical signal, or a thermal printer wherein semiconductor chips are incorporated to thermally convert image information and record an image onto a recording medium.

2. Description of the Related Art

Conventionally, semiconductor chips have been incorporated in an image reader and a thermal print head. In the conventional image reader, an image on a document is formed in a photo-converting section by a lens system, thereby reading information on the document. However, there is a growing need for equipment that can read a large-sized document can. Particularly, an image reader, which can sufficiently read the document as large as A4-sized or B4-sized documents, has been required. Such a technique has been also required in the recording apparatus such as a thermal print head as well as the reader.

For example, Japanese Patent Application No. 62-31159 discloses a reader in which a plurality of semiconductor chips having a photo-converting section are connected by bonding wires in a direction where photo-converting elements are arranged. According to such a reader, the large-sized documents can be sufficiently read.

However, if the rod lens, such as SELFOC lens, is provided between the document and the photo-converting section, the size of the apparatus is necessarily enlarged. For this reason, there has recently been considered a reader from which the optical system is removed, that is, the reader wherein a photo-converting section having the same size as a document is disposed to the document and information on the document is read. In other words, in the above-structured reader, in view of the improvement of reading accuracy, it is preferable to place the document close to the photo-converting section at substantially 50 μm to read information on the document.

However, if the document is placed closer to the photo-converting section to improve the reading accuracy, bonding wires, which are used to connect the chips having the photoelectric converting section, come near the document and the photo-converting section, thereby preventing the document from being transferred or causing the breakage of the bonding wires.

In order to allow the chips to be connected in the region other than the region where the document and the photo-converting section are placed closer to each other, each chip is enlarged in a sub-scanning direction. Thereby, making it possible to prevent the document from being transferred by the bonding wires.

However, enlarging the respective chips in the sub-scanning direction increases not only the size of the apparatus but also the manufacturing cost of the apparatus. Particularly, it has been required that the width of the chip be less than 1 mm to obtain the low manufacturing cost of the apparatus by forming a large number of chips out of one substrate.

SUMMARY OF THE INVENTION

An object of the present invention is to provide an apparatus in which a series of semiconductor chips are electrically connected to each other, and on which a medium can be transferred.

Accordingly, the present invention provides an apparatus including a semiconductor device, which comprises a first operating section, a first driving circuit for driving the first operating section, a first semiconductor chip having a first input/output (I/O) pad for inputting-/outputting a signal in its substrate, a second operating section, a second driving circuit for driving the second operating section, a second semiconductor chip having a second I/0 pad for inputting/ outputting a signal and connected to the first semiconductor chip in series, and a holding substrate for holding the first and second semiconductor chips, wherein information on a medium is recorded or read in a medium passing region, which is on the first and second semiconductor chips, and the first and second I/0 pads are formed outside of the medium passing regions on the first and second semiconductor chips.

As mentioned above, in the apparatus wherein the semiconductor chips are incorporated, information recording or reproducing is performed by a plurality of semiconductor chips, thereby making it sufficiently possible to read the large-sized document, such as A4 or B4-sized documents or to record information to the large-sized document.

Moreover, an I/O pad is formed in each semiconductor chip to input/output a signal to/from the region outside of the medium passing region. Due to this, the medium can be made closer to the semiconductor chips and recording or reading can be performed with high performance and high reliance.

In the apparatus wherein the above-structured semiconductor chips are incorporated, various operating methods can be considered. Depending on the operating method, the first and second I/O pads may be connected to each other by a wiring section.

In an image reader to which the present invention is applied, if the apparatus is sequentially operated from the first semiconductor chip to the second semiconductor chip, it is possible to connect the first output pad for outputting an operation signal of the first semiconductor chip to the second input pad for inputting an operation signal of the second semiconductor chip. According to the above-structured reader, information reading for one line can be easily and sequentially performed without providing unnecessary external circuits.

If the reader is structured as mentioned above, influence of noise must be considered since the connecting distance between the chips is longer than that of the conventional reader wherein the semiconductor chips are connected by bonding wires. In this case, according to the present invention, such influence of noise can be easily overcome by providing, for example, a buffer circuit in the semiconductor chips. Moreover, distortion of a waveform can be sufficiently controlled by providing, for example, a waveform shaping circuit in the wiring section.

In a case where the first semiconductor chip is connected to the second semiconductor chip, an operation signal, which was delayed for the operation cycle of one line of the first semiconductor chip, is designed to be input to the second input pad of the second semiconductor chip from the other driving means. Thereby, information reading for one line can be easily and sequentially performed even if the apparatus is operated by individual driving means.

Furthermore, the first and second semiconductor chips are structured to be individually operated. Also, the first and second semiconductor chips are structured to be simultaneously operated. Thereby, a high speed driving can be performed. In the above-mentioned structure, one line image is divided and converted into two image signals corresponding to the one time image and the two image signals are added and processed by an external circuit for sequentially outputting information as one line after storing read information is once stored in a memory. However, this signal process and the external circuit are also complicated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a perspective view showing a partially enlarged image loader of FIG. 1;

FIG. 3 is a cross sectional view showing schematically the image reader of FIG. 1;

FIGS. 5A and 5B are diagrams showing equivalent circuits of the image reader of FIG. 1 according to the other embodiment;

FIGS. 6A to 6I are timing charts showing the operation of the image reader of FIG. 5;

FIG. 7 is a perspective view showing schematically a thermal print head according to one embodiment of the present invention;

DETAILED DESCRIPTION OF THE PREFERRED EMBODIMENTS

The embodiments of the apparatus according to the present invention, wherein a series of semiconductor chips electrically connected to each other are incorporated, will be described with reference to the drawings.

Figure 1:
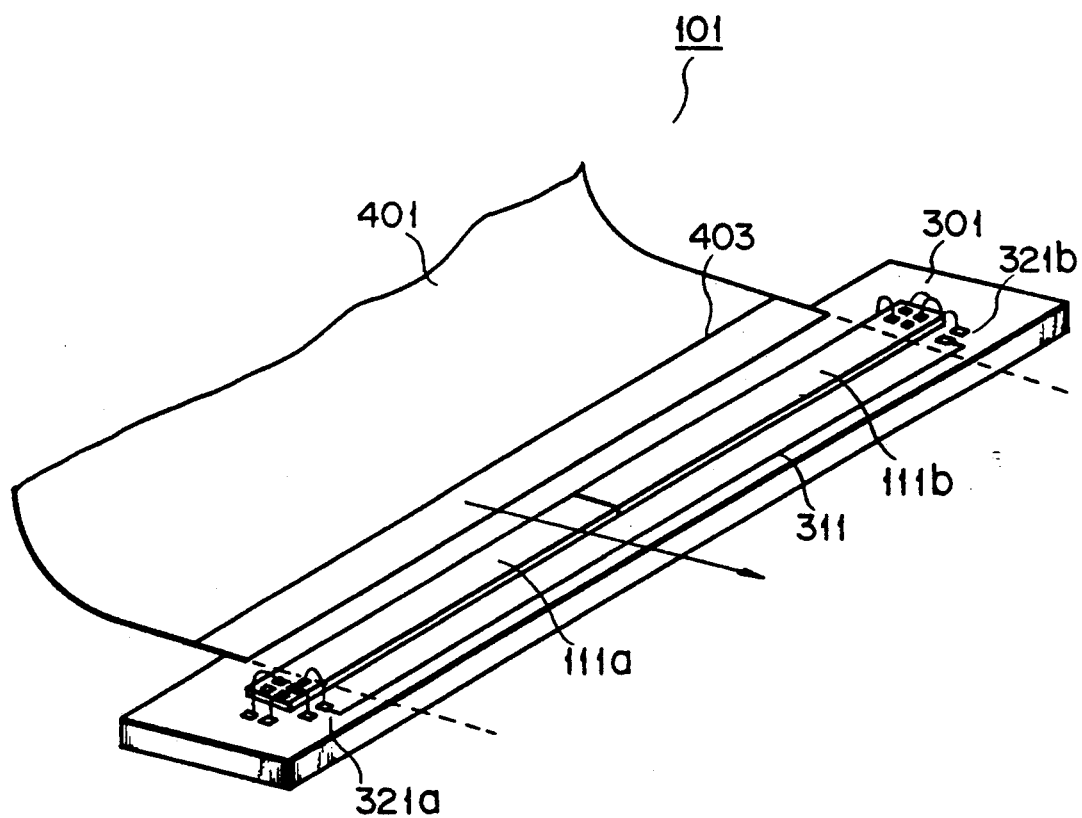
FIG. 1 is a perspective view showing schematically an image reader according to one embodiment of the present invention.

A first embodiment to which the present invention is applied will be explained with reference to FIGS. 1 to 6. FIG. 1 is a schematic perspective view of an image reader 101 of the present invention, and FIG. 2 is an enlarged view of the main part of the image reader 101 of FIG. 1.

In the image reader 101, a first semiconductor chip 111a and a second semiconductor chip 111b are linearly formed on an insulating holding substrate 301 in such a manner that their edges are connected to each other. As shown in FIG. 2, on the first semiconductor chip 111a, which comprises a plurality of light receiving elements 153a formed on a main surface of a transparent insulating substrate 123a in an array manner and a driving circuit 131a for driving the light receiving element section 151a. A cover glass 181a is formed on the light receiving element section 151a and the driving circuit 131a to protect these parts, such as the light receiving elements, and to maintain the distance between the document and the light receiving elements at substantially 50 $\mu$m. Moreover, on the other main part of the transparent insulating substrate 123a, there is provided a surface light source 121a, for lighting a document, which is formed of a thin film electroluminescence element. The first semiconductor chip 111a is structured as mentioned above. The second semiconductor chip 111b (not shown) is structured in the same manner as the first semiconductor chip 111a.

The semiconductor chips 111a and 111b will be explained with reference to the schematic cross section of the first semiconductor chip 111a of FIG. 3. FIG. 3 is a schematic cross section showing the light receiving element section 151a provided on the transparent insulating substrate 123a made of glass and a thin film transistor 147a (hereinafter called "TFT") constituting the driving circuit 131a. The light receiving element section 151a comprises a plurality of individual electrodes 154a formed of chromium (Cr), an amorphous silicon layer (a - Si) 155a provided on the individual electrodes 154a, an amorphous silicon carbide layer (a - SiC) 156a provided on the amorphous silicon layer 155a to prevent a leak current, an indium tin oxide (ITO) 157a layered in common on the amorphous silicon layer 155a, and a common electrode 158a connected to ITO 157a. The thin film transistor 147a, which constitutes the driving circuit 131a, comprises an active layer 133a formed of polycrystalline silicon, an insulating film 135a partially formed on the active layer 133a by thermal oxidation of the polycrystalline L silicon, and a gate electrode 137a formed of doped polysilicon. A source region 133b of the active layer 133a or a drain region 133c is formed where an activator is ion-implanted by a self-alignment method and activated. Another insulating film 139a is formed on the peripheral portion of the gate electrode 137a. A source electrode 141a, which is formed of aluminum Al, or a drain electrode 143a is formed on the source region 133b or the drain region 133c. Moreover, on the driving circuit 131a and the light receiving element section 151a, there is provided the protection glass 181a via an adhesive layer 171a.

In the above-structured reader 101, as shown in FIG. 1, a document 401 passes closer to the light receiving element sections 151aand 151b and is passed thereon by a platen roller (not shown). The series arrangement of the first and second semiconductor chips, which are placed outside of a document passing region 403 allowing a document 401 to be passed, is connected to input-/output (IO) pads 321a and 321b. Both ends of the I/O pads 321a and 321b are formed on a holding substrate 301 by bonding wires. Moreover, input/output pads 321a and 321b are connected in series by a lead wire 311 formed on the surface of the holding substrate 301. Also, the input/output pads 321a and 321b may be connected in series by the lead wire 311 in such a manner that the lead wire 311 is formed on the rear surface of the holding substrate 301 or in the holding substrate 301.

As mentioned above, in the image reader 101 wherein the first and second semiconductor chips 111a and 111b, comprising the light receiving element section 151a and the driving circuit 131a, are connected in series, information on the document 401 can be read in a manner in which the document is sufficiently closer to each light receiving element 153a even if the document 401 is large-sized.

Moreover, in the above-structured reader, since the chip widths of the first and second semiconductor chips 111a and 111b can be formed to be about 1 mm, the reader can be miniaturized. Also, since a plurality of semiconductor chips 111a and 111b can be surely formed out of one substrate, the manufacturing cost of the reader 1 can be reduced.

Figure 4:
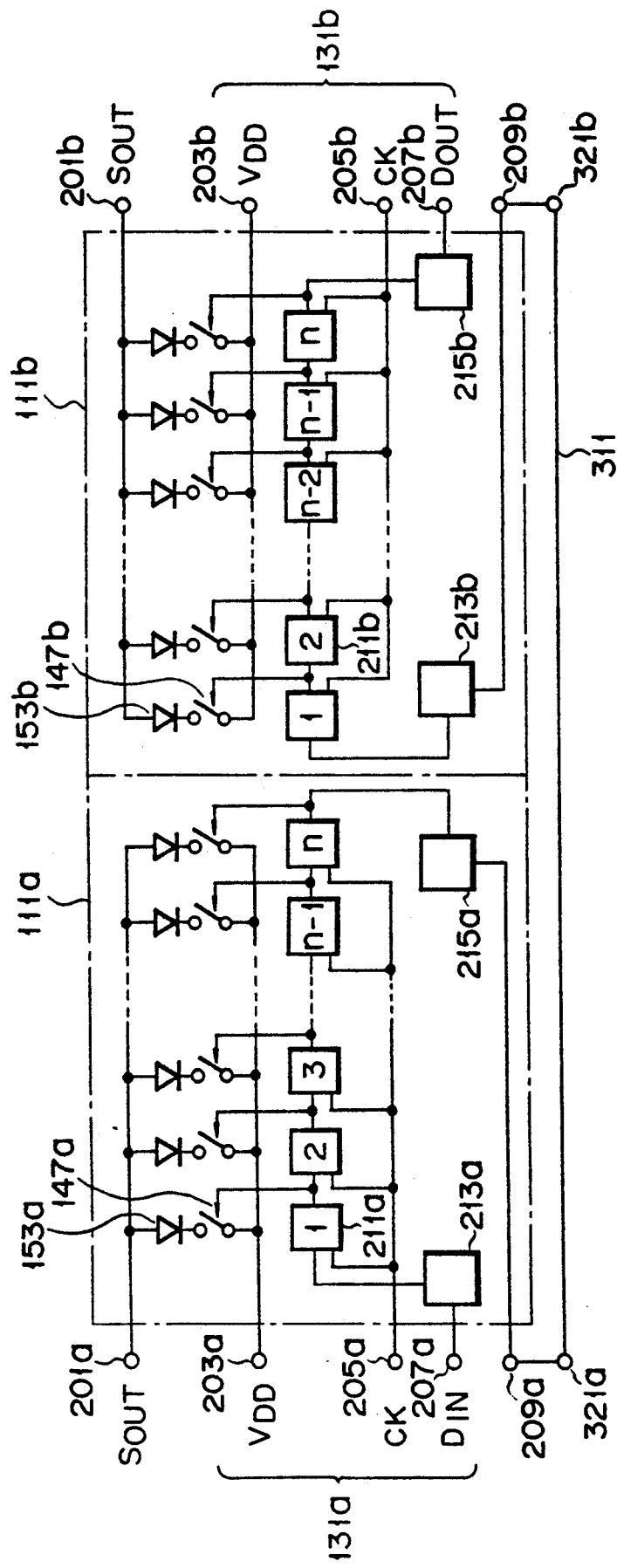
FIG. 4 is a diagram showing an equivalent circuit of the image reader of FIG. 1.

FIG. 4 shows one example of an equivalent circuit of the above-mentioned reader 101. The reader 101 will be explained with reference to the equivalent circuit of FIG. 4.

Voltage of +5 V is applied to $V_{DD}$ terminal 203a of the first semiconductor chip 11a, an inverting input terminal (not shown) of an inverting amplifier or an operational amplifier (not shown) using an arithmetic amplifier (not shown) connected to an $S_{out}$ terminal 201a. Then, the light receiving element 153a is provided so that a reverse bias is applied to the portion between the $V_{DD}$ terminal 203 and the $S_{OUT}$ terminal 201a. TFT 147a is provided between the light receiving element 1533a and the $V_{DD}$ terminal 203a so that the operation of the light receiving element 153a can be controlled. Then, the gate electrode 137a of TFT 147a (FIG. 3) is connected to the output of D-typed flip-flop circuits 211a corresponding to each TFT 147a. The on/off control of TFT 147a is performed in accordance with the signal of the flip-flop circuit 211a.

The flip-flop circuits 211a corresponding to each TFT 147a are respectively connected in series. The connection of the flip-flop circuits 211a is made so that a clock signal is input thereto from a CK terminal 205a. Moreover, the connection of the flip-flop circuits 211a corresponding to the first light sensitive elements 153b is made so that a shift resister input signal is input thereto from a $D_{IN}$ terminal 207a via shift register input circuit 213a.

Then, an output, which is sent from the flip-flop circuits 211a to drive n th light receiving element 153a of the first semiconductor chip 111a, is connected to a gate electrode (not shown) of n th TFT 147a and the first I/O terminal 209a via a shift register output circuit 215a.

Similar to the first semiconductor chip 111a, in the second semiconductor chip 111b, voltage of +5V is applied to a second $V_{DD}$ terminal 203b and a minus terminal (not shown) of the reverse amplifier is connected to a second $S_{OUT}$ terminal 201b. Then, a reverse bias is applied to a second light receiving element 153b in which one of terminals is connected to TFT 147b.

The gate electrode (not shown) of each TFT 147b is connected to the output sent from D-typed second flip-flop circuits 211b corresponding to the second TFTs 147b. Each TFT 147b performs ON/OFF operation in accordance with a signal sent from the second flip-flop circuit 211b.

The flip-flop circuits 211b corresponding to each TFT 147b are respectively connected in series. The connection of the flip-flop circuits 211b is made so that a clock signal is input thereto from a second CK terminal 205b similar to the case wherein the clock signal is input to the first semiconductor chip 111a. Moreover, the connection of the flip-flop circuits 211b corresponding to the second light receiving elements 153b is made so that a shift resister input signal is input thereto via a first I/O pad 321a of the first semiconductor chip 111a, a second I/O pad 321b connected by a lead wire 311 on the holding substrate 301, and a second shift register input circuit 213b connected to the second I/O pad 321b.

Then, an output, which is sent from the flip-flop circuits 211b to drive n th light receiving element 153b of the second semiconductor chip 111b, is connected to a gate electrode (not shown) of n th TFT 147b and a second $D_{OUT}$ terminal 207b via a second shift register output circuit 215b.

If TFTs 147a and 147b are turned on, the reverse bias voltage is applied to the light receiving elements 153a and 153b, and a parasitic capacity of the light receiving elements 153a and 153b is charged. Then, if TFTs 147a and 147b are turned off with respect to the signal sent from the flip-flop circuits 211a and 211b, the parasitic capacity stored in the light receiving elements 153a and 153b is discharged. If TFTs 147a and 147b are turned on again after a predetermined cycle of time, the electric charge, which was discharged in accordance with quantity of light, is stored again in the light receiving elements 153a and 153b. The TFTs 147a and 147b are sequentially turned on, when one picture element as shown in FIG. 6A is input into the shift register at the predetermined cycle. The discharging current is read from $S_{OUT}$ terminals 201a and 201b, thereby information on the document 401 shown in FIG. 1 can be read.

In the above-structured image reader 101, the connection of the first semiconductor chip 111a to the second semiconductor chip 111b is made in such a manner that the first I/O pad 321a is connected to the second I/O pad 321b by the lead wire 311 formed on the holding substrate 301.

Due to this, it can be considered that distortion of the waveform of the shift register signal is generated between the first and second semiconductor chips 111a and 111b. However, according to the above embodiment, since shift register input circuits 213a, 213b and shift register output circuits 215b and 215b were respectively provided in the first and second semiconductor chips 111a and 111b little distortion of the waveform of the shift register signal was generated.

In place of the shift register input circuits 213a, 213b, and the shift output circuits 215b and 215b, for example, the Schmit Trigger circuit and an output driver circuit is provided, thereby influence of noise, which is caused by the elongation of the pattern of the first and second I/O pads 321a and 321b, can be overcome.

If the cycle of the clock signal is made faster to perform the high speed reading by the above structured image reader 101, the shift register input signal may be distorted by resistance of the lead wire 311 or superimposed.

Therefore, in the above case, in place of the first shift register output circuit 215b and second shift register input circuit 215b, for example, waveform shaping circuits 221 and 231 may provided as shown in FIG. 5.

The waveform shaping circuit 221, which is provided in place of the shift register output circuit 215a of the first semiconductor chip 111a, comprises an OR circuit 223 in which the output of n th—second flip-flop circuit and that of n th—third flip-flop circuit are connected, and a buffer circuit 225 which is connected to the OR circuit 223.

The waveform shaping circuit 231, which is provided in place of the shift input circuit 213b of the second semiconductor chip 111b, comprises a buffer circuit 233, which is connected to the output sent from the waveform shaping circuit 239 221 via the second I/O pad 321b, two flip-flop circuits 235, 237, which are connected to the buffer circuit 233 in series, and an AND circuit to which the outputs of the flip-flop circuits 235 and 237 are connected in series. Then, the clock signal, having twice the cycle of the clock signal, which is input from the second CK terminal 205, is input to the third CK terminal 210.

Also, the clock signal, which is input from the second CK terminal 205b, is connected to the second flip-flop circuit 237.

The operation using these waveform shaping circuits 221 and 231 will be explained with reference to the timing chart of FIG. 6. The shift register input signal, which is input from the D$_{IN}$ in terminal 207a, is synchronized with the clock signal shown in FIG. 6I, which is input from the first CK terminal 205a. For example, the output signal as shown in FIG. 6A can be obtained from n th—third flip-flop circuit 211a, and the output signal as shown in FIG. 6B can be obtained from n th—second flip-flop circuit 211a.

The OR of these output signals is output from the OR circuit 223 shown in FIG. 6C. In a case where the clock signal having a high speed cycle is used, the output signal will have a long rise and fall time as shown in FIG. 6D after passing through the buffer circuit 225.

The above signal is input to the flip-flop circuit 235, which is operated by the clock signal shown in FIG. 6I having double cycle sent from the third CK terminal 210, after passing through the buffer circuit 233 of the waveform shaping circuit 231 of the second semiconductor chip 111b. After the input signal is waveform-shaped as shown in FIG. 6E, the waveform-shaped signal is input to an AND circuit 239 and the flip-flop circuit 237.

Since the clock signal having double cycle of the other flip-flop circuit is input to the flip-flop circuit 237, a signal waveform-shaped as shown in FIG. 6F is input to AND circuit 239.

Therefore, the output sent from AND circuit 239 is synchronized with the clock signal input from the second CK terminal 205b as shown in FIG. 6G. Thereby, the signal, which is sufficiently waveform-shaped, is input to the first flip-flop circuit 211b.

Due to this, by use of the above-mentioned waveform shaping circuits 221 and 231, the shift register input signal is not distorted by the lead wire 311, which connects the first semiconductor chip 111a to the second semiconductor chip 111b, even if the reader 101 comprises sufficiently large first semiconductor chip 111a or second semiconductor chip 111b in order to read sufficiently large document 401.

The above embodiment explained one example of the equivalent circuit of the reader 101. However, the present invention can use the other circuit structure.

Next, a second embodiment in which the present invention is applied to a thermal print head will be explained with reference to FIGS. 7 to 10.

Figure 8:
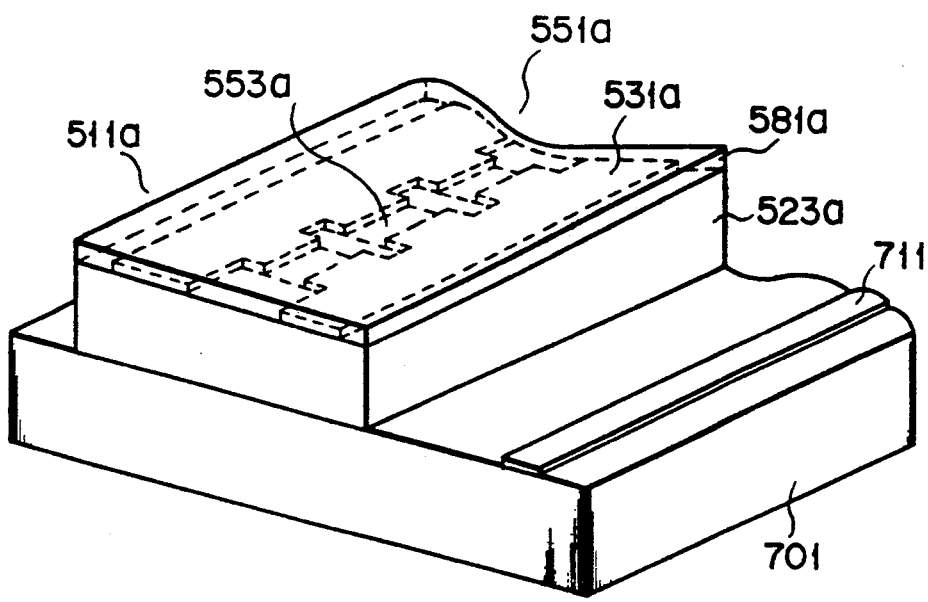
FIG. 8 is a perspective view showing a partially enlarged thermal print head of FIG. 7.

FIG. 7 is a perspective view showing schematically a thermal print head 501 according to the second embodiment of the present invention; and FIG. 8 is a perspective view showing an enlarged main part of the thermal print head 501 of FIG. 7.

In the thermal print head 501, a first semiconductor chip 511a and a second semiconductor chip 511b are linearly formed on an insulating holding substrate 701 in the same manner as of that of the reader 101. The first and second semiconductor chips 511a and 511b are connected in such a manner that an output pad and an input pad are connected to a lead wire 711 formed on a holding substrate 701 by bonding wires.

The first semiconductor chip 511a comprises a heat resisting section 551a mainly formed in an array manner and a driving circuit 531a for driving the heat resisting section 551. The second semiconductor chip 511b is structured similar to the first semiconductor chip 511a.

Figure 9:
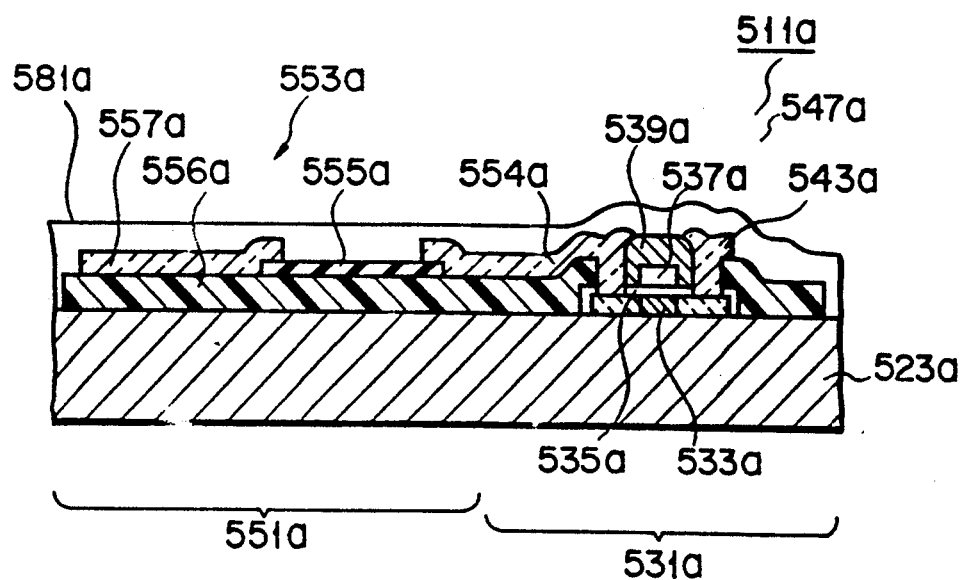
FIG. 9 is a cross sectional view showing schematically the thermal print head of FIG. 7.

FIG. 9 is a schematic cross sectional view of the first semiconductor chip 511a constituting the above-mentioned thermal printing head. The heat resisting section 551a and the driving circuit 531a of the respective semiconductor chips 511a and 511b formed on a glass substrate 523 are structured as follows.

In the heat resisting section 551a, a resisting member 555a formed of Ta—SiO$_2$ is formed between a common electrode 557a and an individual electrode 554a extended from the driving circuit 531a. The resisting member 555a may be formed of polycrystalline silicon film.

In order to form the resisting member 555a on the glass substrate 523a without defects, an SNZY film 556a (non-crystalline member consisting of Si, N, Zr, Yi) is formed between the glass substrate 523a and the resisting member 555a. This embodiment shows the example in which SNZY film 556a is used. However, a film of silicon oxide or silicon carbide may be used.

The driving circuit 531a comprises a plurality of TFTs 547a. An active layer 533a is formed of polycrystalline silicon. An insulating film 535a, which is partially formed on the active layer 533a, is formed of a thermal oxidation film of the polycrystalline silicon. A gate electrode 537a is formed of dope polysilicon. A source region 533a of the active layer 533a or a drain region 533c are formed whereby an activator is ion-implanted by a self-alignment system and activated. A source electrode 554a, which is formed of aluminum Al to be integral with the individual electrode 554a, or a drain electrode 543a is formed on the source region 533b and the drain region 533c.

According to the above-structured thermal print head 501, the document 401 can be passed while contacting the heat resisting section 551a and the shape of the apparatus can be made longer.

Figure 10:
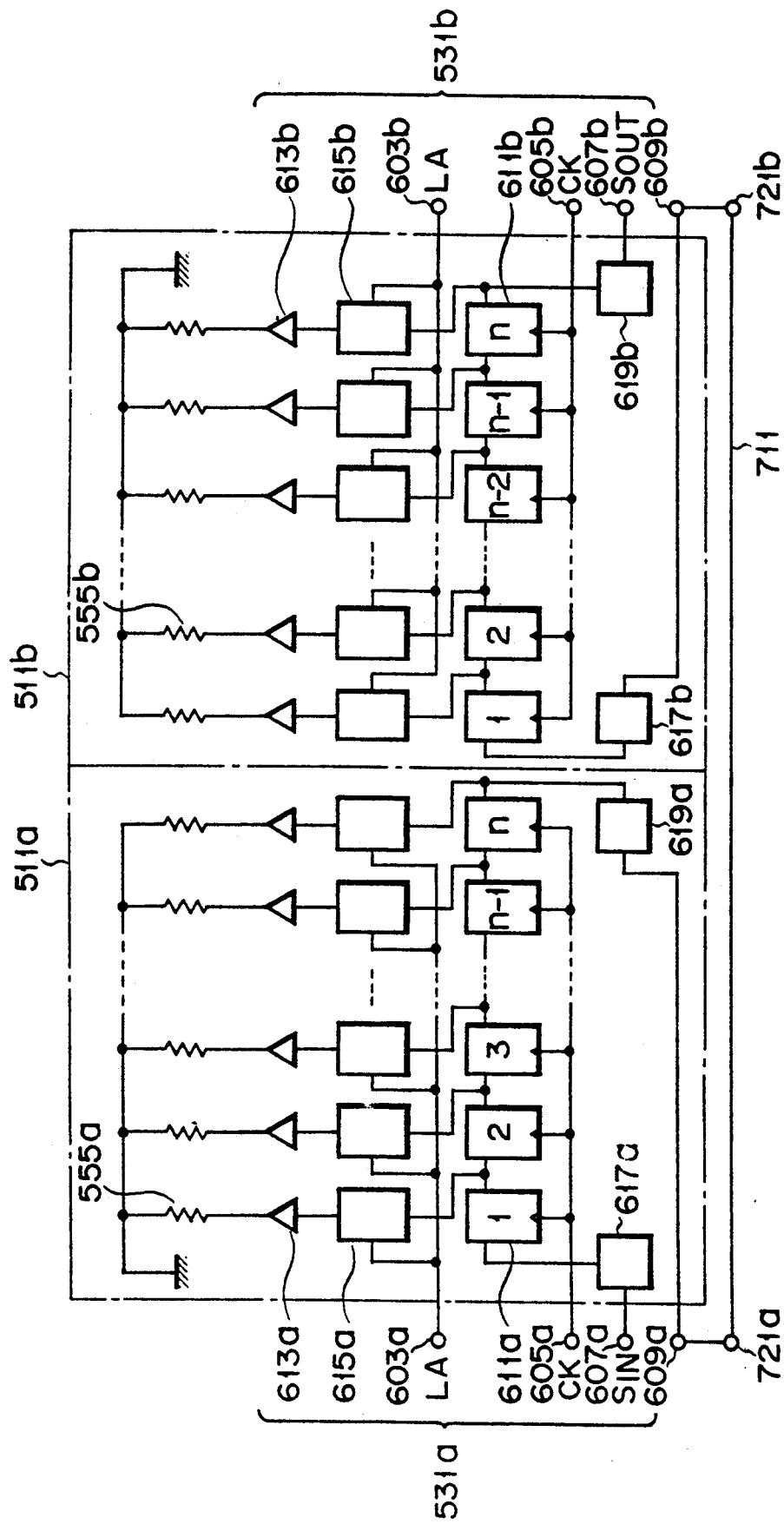
FIG. 10 is an equivalent circuit of the thermal print head of FIG. 7.

FIG. 10 is one example of an equivalent circuit of the thermal print head of the second embodiment. The operation of the thermal print head 501 of this embodiment will be explained in detail.

As shown in FIG. 10, one terminal of the resisting elements 555a and 555b is connected in common, and the other terminal is connected to the driving circuits 531a and 531b. The driving circuits 531a and 531b comprise shift registers 611a and 611b, a latch circuits 615a and 615b, and drivers 613a and 613b.

An image signal is synchronized with a clock signal, which is input from a CK terminal 605a of the first semiconductor chip 511a, via a shift register input circuit 617a from $S_{IN}$ terminal 607a. Thereby, the image signal is sequentially transmitted on the respective flip-flop circuits of the shift register 611a, and reaches to the flip-flop circuit of the final state of the shift register 611a of the first semiconductor chip 511a. Then, the image signal reaches to the lead wire 711 via the shift register output circuit 619a, an input/output (I/O) terminal 609a and an I/O pad 721a. Further, the image signal is input to the shift register input circuit 617b of the second semiconductor chip 511b via an I/O pad 721b and an I/O terminal 609b from the lead wire 711. Moreover, the image signal is synchronized with the clock signal, which is input from the second CK terminal 605b, and sequentially transmitted on the flip-flop circuit constituting the shift register 611b of the second semiconductor chip 511b.

The above-transmitted image signal is held in the latch circuits 615a and 615b of the first and second semiconductor chips 511a and 511b. Then, if an ON signal is applied thereto from LA terminals 603a and 603b, a predetermined voltage is applied to the resisting members 555a and 555b via drivers 613a and 613b, thereby information is recorded in the medium.

Also, information can be clearly recorded by providing an ENABLE terminal in the drivers 613a and 613b (not shown) and controlling the pulse width sent from the output signal. Moreover, a divisional driving can be performed in one line by dividing an ENABLE signal.

If the cycle of the clock signal is made faster to perform the high speed recording by the above structured-thermal print head, the shift register input signal may be distorted by resistance of the lead wire 711 or superimposed.

In such a case, a line driving circuit and a line receiving circuit are used in place of the first shift register output circuit 619a and the second shift register input circuit 617b, thereby the high speed recording can be attained. Moreover, the distortion of the waveform can be shaped by providing an OR circuit (not shown) in which the signal sent from the first shift register output circuit 619a and the output sent from a reference voltage generating circuit (not shown) are connected.

According to the above-structured thermal print head 501, information can be clearly recorded in the large-sized document such as A4 or B4-sized document. Also, even if the width of the respective semiconductor chips 511a and 511b is made small, the connection between the first and second semiconductor chips 511a and 511b can be made. Therefore, a large number of semiconductor chips 511a and 511b can be formed out of one substrate, and the manufacturing cost of the apparatus can be reduced. Also, the reduction of the size of the apparatus can be attained.

As mentioned above, according to the present invention, since the connection between the semiconductor chips is made in the region outside the medium passing region, the medium can be transferred while being made sufficiently closer to the semiconductor chips. Therefore, information reading or recording can be performed with high accuracy.

Moreover, the connection between the semiconductor chips having small chip widths can be made and the size of the apparatus can be reduced. Also, since the semiconductor chips having small chip widths can be used, a large number of semiconductor chips can be obtained from one substrate and the manufacturing cost of the apparatus can be reduced.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A thermal print head apparatus, comprising:
 a first elongated semiconductor chip having first and second ends, a first surface portion provided at the first end and a first elongated surface continuous to the first surface portion and elongated to the second end, including:
   a first heat generating section having heat generating points, which is formed in the first elongated surface of the first semiconductor chip,
   a first driving section for driving the first heat generating section, the first driving section also being formed in the first elongated surface of the first semiconductor chip, and
   a plurality of first conductive pads which are connected to the first driving section and formed on the first surface portion;
 a second elongated semiconductor chip having first and second ends, a second surface portion provided at the second end and a second elongated surface continuous to the second surfaced portion and elongated to the first end, including:
   a second heat generating section having heat generating points, which is formed in the second elongated surface of the second semiconductor chip,
   a second driving section for driving the second heat generating section, the second driving section also being formed in the second elongated surface of the second semiconductor chip, and
   a plurality of second conductive pads which are connected to the second driving section and formed on the second surface portion;
 an electrical insulating base having a surface on which the first and second elongated semiconductor chips are arranged in series so that the second end of the first semiconductor chip contacts the first end of the second semiconductor chip and the first and second surfaces are continuously arranges in series, the series arrangement of the first and second surfaces defining a lateral traveling path for a recording medium between the first and second conductive pads;
 conductive leas, formed on the electrical insulating base; and
 connecting means for connecting the plurality of first and second conductive pads to the conductive leads, the connecting means provided outside of the lateral traveling path and a periphery of the recording medium.

2. The apparatus according to claim 1, wherein at least one of the first and the second heat generating section includes:

an insulating layer formed on the electrical insulating base;

a common electrode formed on the insulating layer; individual electrodes; and resisting layers corresponding to the heat generating points formed on the insulating layer and connected to a corresponding individual electrode and the common electrode.

3. The apparatus according to claim 2, wherein at least one of the first and the second driving section includes thin film transistors, each of the thin film transistors having a gate electrode.

4. The apparatus according to claim 3, wherein at least one of the first and the second heat generating section includes an array of register elements.

5. The apparatus according to claim 4, wherein the one of the first and the second driving section includes drivers for supplying currents to the register elements, respectively.

6. The apparatus according to claim 5, wherein the one of the first and second driving section includes latch circuits connected to the drivers respectively.

7. The apparatus according to claim 6, wherein the one of the first and the second driving section includes shift registers connected to the latch circuits, respectively, each supplied with a clock pulse signal.

8. The apparatus according to claim 3, wherein each thin film transistor includes a semiconductor layer formed on the electrical insulating base and having a source and drain, a source electrode and a drain electrode formed on the source and drain and connected to corresponding individual electrodes, respectively, an insulating layer formed on the semiconductor layer, a gate electrode formed on the insulating layer, and a gate protecting film formed on the gate electrode.

9. The apparatus according to claim 1, wherein the connecting means comprises bonding wires connecting the first and the second conductive pads to the conductive leads.

10. The apparatus according to claim 1, wherein the electrical insulating base is an electrical insulating transparent base.

11. The apparatus according to claim 1, wherein the first conductive pads are connected in series to corresponding second conductive pads through corresponding conductive leads, respectively.

12. A thermal print head apparatus for a printer which records an image on an image medium, comprising:

a first elongated semiconductor chip having first and second ends, a first surface portion provided at the first end and a first elongated surface continuous to the first surface portion and elongated to the second end, including:
a first heat generating section having heat generating points, which si formed in the first elongated surface of the first semiconductor chip,
a first driving section for driving the first heat generating section, the first driving section also being formed in the first elongated surface of the first semiconductor chip, and
a plurality of first conductive pads which are connected to the first driving section and formed on the first surface portion;

a second elongated semiconductor chip having first and second ends, a second surface portion provided at the second end and a second elongated surface continuous to the second surface portion and elongated to the first end, including:
a second heat generating section having heat generating points, which is formed in the second elongated surface of the second semiconductor chip,
a second driving section for driving the second heat generating section, the second driving section also being formed in the second elongated surface of the second semiconductor chip, and
a plurality of second conductive pads which are connected to the second driving section and formed on the second surface portion;

an electrical insulating base having a surface on which the first and second elongated semiconductor chips are arranged in series so that the second end of the first semiconductor chip contacts the first end of the second semiconductor chip and the first and second surfaces are continuously chip and the the series arrangement of the first and second surfaces defining a lateral traveling path for a recording medium between the first and a second conductive pads; and supplying means for supplying energizing signals to the first and second driving sections through the first and second conductive pads to energize the first and second driving sections, respectively, the supplying means being provided outside of the lateral traveling path and a periphery of the recording medium.

13. The apparatus according to claim 12, wherein the supplying means includes first and second conductive lead provided at the first end of the first semiconductor chip and the second end of the second semiconductor chip and connected to the first and second conductive pads.

14. The apparatus according to claim 12, wherein at least one of the first and second driving sections comprises a waveform shaping circuit.

15. The apparatus according to claim 14, wherein the first elongated semiconductor chip and the second elongated semiconductor chip are both independently driven.

16. The apparatus according to claim 12, further comprising a protection glass formed on the series arrangement of the first and second elongated surfaces.

17. The apparatus according to claim 12, wherein the electrical insulating base is an electrical insulating transparent base.

18. The apparatus according to claim 12, wherein the first and second driving sections include thin film transistors each of the thin film transistors having a gate electrode.

19. The apparatus according to claim 18, wherein the first and second heat generating sections include an array of resistance elements, each of the resistance elements connected to the first and second thin film transistors, respectively.

20. The apparatus according to claim 12, wherein the first and second driving section includes shift registers connected to input and output circuits.

21. The apparatus according to claim 20, wherein the output circuit is an output drive circuit and the input circuit is a Schmitt trigger circuit.

22. The apparatus according to claim 12, wherein the first and second heat generating sections include individual electrodes, a common electrode, resistive layers corresponding to the heating generating points and connected to a corresponding individual electrode and the common electrode.

23. The apparatus according to claim 18, wherein the thin film transistors include a semiconductor layer formed on the electrical insulating transparent base and having a source and drain, a source electrode and a drain electrode formed on the source and drain, respectively, and connected to corresponding individual electrodes, respectively, an insulating layer formed on the semiconductor layer, a gate electrode formed on the insulating layer, and a gate protecting film formed on the gate electrode.

24. The apparatus according to claim 12, wherein the supplying means includes conductive leads formed on the electrical insulating base and bonding wires connecting the first and second plurality of conductive pads to the conductive leads, respectively.

25. The apparatus according to claim 12, wherein the first conductive pads are connected in series to the corresponding second conductive pads through corresponding conductive leads, respectively.

26. A thermal print head apparatus, comprising:
a first elongated semiconductor chip having first and second ends, a first surface portion provided at the first and and a first elongated surface continuous to the first surface portion and elongated to the second end, including:
a first heat generating section having heat generating points, which is formed in the first elongated surface of the first semiconductor chip,
a first driving section for driving the first heat generating section, the first driving section also being formed in the first elongated surface of the first semiconductor chip, and
a plurality of first conductive pads which are connected to the first driving section and formed on the first surface portion;
a second elongated semiconductor chip having first and second ends, a second surface portion provided at the second end and as second elongated surface continuous to the second surface portion and elongated to the first end, including:
a second heat generating section having heat generating points, which is formed in the second elongated surface of the second semiconductor chip,
a second driving section for driving the second heat generating section, the second driving section also being formed in the second elongated surface of the second semiconductor chip, and
a plurality of second conductive pads which are connected to the second driving section and formed on the second surface portion;
an electrical insulating base having a surface on which the first and second elongated semiconductor chips are arranged in series so that the second end of the first semiconductor chip contacts the first end of the second semiconductor chip and the first and second surfaces are continuously arranged in series, the series arrangement of the first and second surfaces defining a lateral traveling path for a recording medium between connecting elements;
conductive leads, formed on the electrical insulating base; and wherein
the connecting element connect the plurality of first and second conductive pads to the conductive leads, the connecting elements are provided outside of the lateral traveling path and a periphery of the recording medium.

27. The apparatus according to claim 26, wherein at least one of the first and the second heat generating section includes:
an insulating layer formed on the electrical insulating base;
a common electrode formed on the insulating layer; individual electrodes; and
resisting layers corresponding to the heat generating points formed on the insulating layer and connected to a corresponding individual electrode and the common electrode.

28. The apparatus according to claim 26, wherein at least one of the first the and second driving section includes thin film transistors, each of the thin film transistors having a gate electrode.

29. The apparatus according to claim 28, wherein at least one of the first and the second heat generating section includes an array of register elements.

30. The apparatus according to claim 29, wherein the one of the first and the second driving section includes drivers for supplying currents to the register elements, respectively.

31. The apparatus according to claim 30, wherein the one of the first and the second driving section includes latch circuits connected to the drivers, respectively.

32. The apparatus according to claim 31, wherein the one of the first and the second driving section includes shift registers connected to the latch circuits, respectively, each supplied with a clock pulse signal.

33. The apparatus according to claim 28, wherein each thin film transistor includes a semiconductor layer formed on the electrical insulating base and having a source and drain, a source electrode and a drain electrode formed on the source and drain and connected to corresponding individual electrodes, respectively, an insulating layer formed on the semiconductor layer, a gate electrode formed on the insulating layer, and a gate protecting film formed on the gate electrode.

34. The apparatus according to claim 26, wherein the connecting elements comprise bonding wires connecting the first and the second conductive pads to the conductive leads.

35. The apparatus according to claim 26, wherein the electrical insulating base is an electrical insulating transparent base.

36. The apparatus according to claim 26, wherein the first conductive pads are connected in series to corresponding second conductive pads through corresponding conductive leads, respectively.

37. A thermal print heat apparatus for a printer which records an image on an image medium, comprising:
a first elongated semiconductor chip having first and second ends, a first surface portion provided at the first end and a first elongated surface continuous to the first surface portion and elongated to the second end, including:
a first heat generating section having heat generating points, which is formed in the first elongated surface of the first semiconductor chip,
a first driving section for driving the first heat generating section, the first driving section also being formed in the first elongated surface of the first semiconductor chip, and
a plurality of first conductive pads which are connected to the first driving section and formed on the first surface portion;

a second elongated semiconductor chip having first and second ends, a second surface portion provided at the second end and a second elongated surface continuous to the second surface portion and elongated to the first end, including:
- a second heat generating section having heat generating points, which is formed in the second elongated surface of the second semiconductor chip,
- a second driving section for driving the second heat generating section, the second driving section also being formed in the second elongated surface of the second semiconductor chip, and
- a plurality of second conductive pads which are connected to the second driving section and formed on the second surface portion;

an electrical insulating base having a surface on which the first and second elongated semiconductor chips are arranged in series so that the second end of the first semiconductor chip contacts the first end of the second semiconductor chip and the first and second surfaces are continuously arranged in series, the series arrangement of the first and second surfaces defining a lateral traveling path for a recording medium between supply elements; and wherein the supply elements supply energizing signals to the first and second driving sections through the first and second conductive pads to energize the first and second driving sections, respectively, the supply elements provided outside of the lateral traveling path and a periphery of the recording medium.

38. The apparatus according to claim 37, wherein the supply elements includes first and second conductive leads provided at the first end of the first semiconductor chip and the second end of the second semiconductor chip and connected to the first and second conductive pads.

39. The apparatus according to claim 37, wherein at least one of the first and second driving sections comprises a waveform shaping circuit.

40. The apparatus according to claim 39, wherein the first elongated semiconductor chip and the second elongated semiconductor chip are both independently driven.

41. The apparatus according to claim 37, further comprising a protection glass formed on the series arrangement of the first and second elongated surfaces.

42. The apparatus according to claim 41, wherein the electrical insulating base is an electrical insulating transparent base.

43. The apparatus according to claim 37, wherein the first and second driving sections include thin film transistors, each of the thin film transistors having a gate electrode.

44. The apparatus according to claim 43, wherein the first and second heat generating sections include an array of resistance elements, each of the resistance elements connected to the first and second thin film transistors, respectively.

45. The apparatus according to claim 37, wherein the first and second driving sections includes shift registers connected to input and output circuits.

46. The apparatus according to claim 45, wherein the output circuit is an output drive circuit and the input circuit is a Schmit trigger circuit.

47. The apparatus according to claim 37, wherein the first and second heat generating sections include individual electrodes, a common electrode, resistive layers corresponding to the heating generating points and connected to a corresponding individual electrode and the common electrode.

48. The apparatus according to claim 43, wherein the thin film transistors include a semiconductor layer formed on the electrical insulating transparent base and having a source and drain, a source electrode and a drain electrode formed on the source and drain, respectively, and connected to corresponding individual electrodes, respectively, an insulating layer formed on the semiconductor layer, a gate electrode formed on the insulating layer, and a gate protecting film formed on the gate electrode.

49. The apparatus according to claim 37, wherein the supply elements includes conductive leads formed on the electrical insulating base and bonding wires connecting the firsts and second plurality of conductive pads to the conductive leads, respectively.

50. The apparatus according to claim 37, wherein the first conductive pads are connected in series to the corresponding second conductive pads through corresponding conductive leads, respectively.

* * * * *